E. T. PETERSON.
FENCEPOST.
APPLICATION FILED MAY 17, 1920.
1,400,455.
Patented Dec. 13, 1921.
2 SHEETS—SHEET 1.
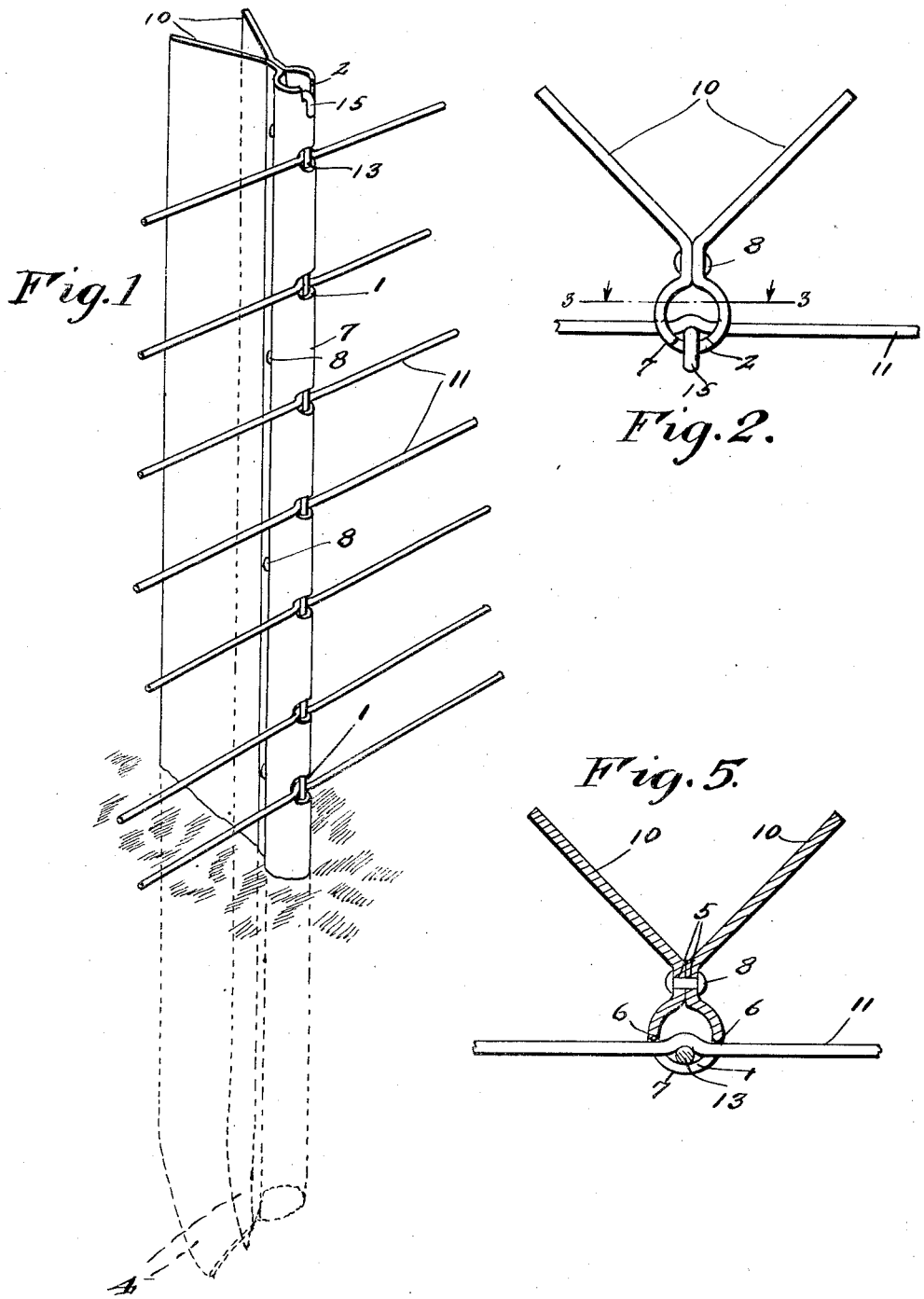
E. T. Peterson  INVENTOR
BY Victor J. Evans  ATTORNEY

E. T. PETERSON.
FENCEPOST.
APPLICATION FILED MAY 17, 1920.

1,400,455.

Patented Dec. 13, 1921.
2 SHEETS—SHEET 2.

E. T. Peterson
INVENTOR

BY *Victor J. Evans*
ATTORNEY

WITNESSES

UNITED STATES PATENT OFFICE.

EDWIN T. PETERSON OF GOWRIE, IOWA.

FENCEPOST.

1,400,455.   Specification of Letters Patent.   Patented Dec. 13, 1921.

Application filed May 17, 1920. Serial No. 382,009.

*To all whom it may concern:*

Be it known that I, EDWIN T. PETERSON, a citizen of the United States, residing at Gowrie, in the county of Webster and State of Iowa, have invented new and useful Improvements in Fenceposts, of which the following is a specification.

The present invention has reference to a metallic fence post.

The object is to produce a metallic fence post having means whereby the same will be effectively supported in the ground and means whereby the line wires of a fence may be easily, quickly and securely attached thereto.

Other objects and advantages will present themselves as the nature of the invention is better understood, reference being had to the accompanying drawings in which there is illustrated a satisfactory exemplification of the improvement to practice.

In the drawings:—

Figure 1 is a perspective view of the post showing the line wires attached thereto.

Fig. 2 is a top plan view of the same.

Fig. 5 is a sectional view through the device as illustrated in Fig. 1, and taken parallel with one of the line wires.

Figure 3:
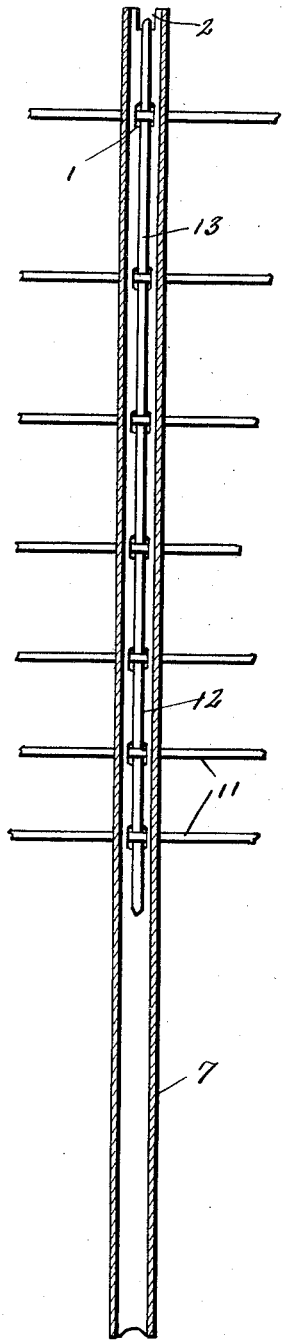
Fig. 3 is a sectional view approximately on the line 3—3 of Fig. 2.
Figure 6:
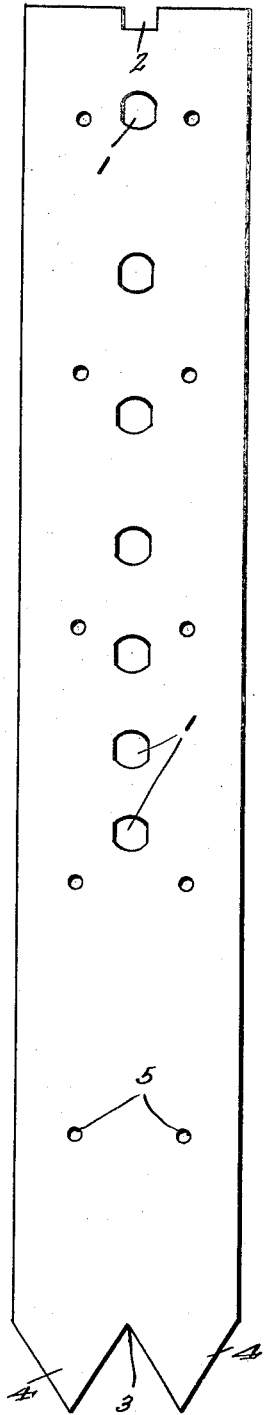
Fig. 6 is a view of the blank from which the post is formed.
Figures 4, 7:
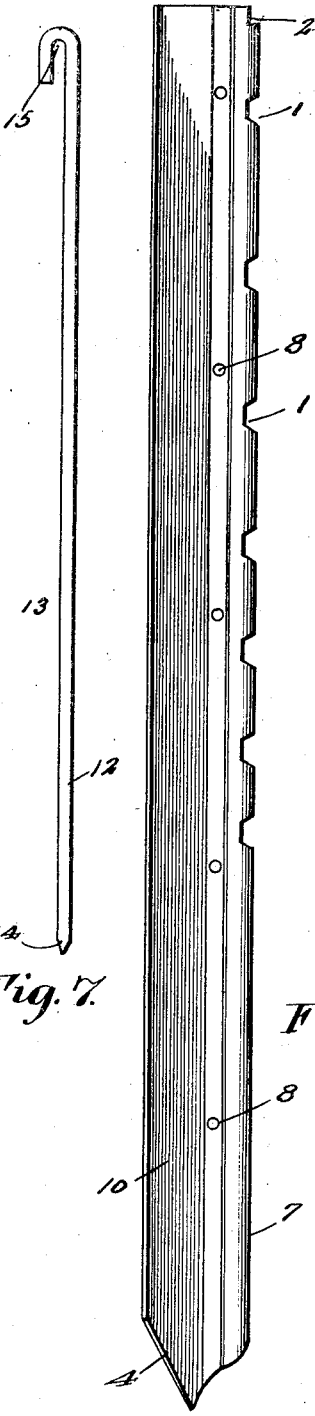
Fig. 4 is a perspective view of the post.
Fig. 7 is a view of the wire retaining key.

As disclosed in Fig. 6 of the drawings my improved fence post is struck from a substantially rectangular blank of material. Before being shaped the blank, at the center thereof is formed with spaced openings 1. These openings are gradually spaced away from each other, the lower series of openings being nearer to each other than the top series so that the lower wires of the fence will be closer together than the upper wires, and consequently fowls and small animals will be prevented from passing between the fields divided by the fence. The blank at the upper straight end thereof is notched as at 2. The opposite edge is centrally formed with a V-shaped notch 3 and from the outer terminals of the walls provided by the said notch, the said outer edge is cut at upward angles. Thus the lower edge of the post is formed with V-shaped prongs that are indicated by the numeral 4.

The blank, at suitable spaced intervals, and to the opposite sides of the central openings 1 have pairs of reduced preferably round openings 5. In this connection it should be here stated that the vertical and opposed walls provided by the openings 1 are centrally concaved or rounded and for distinction such walls are indicated by the numeral 6. In addition to being rounded the said walls are slightly beveled so that the line wires, when the same are received in the openings 1, as will hereinafter be more fully set forth will not contact with any straight surface which would serve to bite thereinto, while also the rounded walls provide a better rest for the line wires. The gripping engagement between these walls 6 and on the line wires caused by the key, hereinafter to be described, is, however, sufficient to prevent the longitudinal movement of the wires through the said openings.

In forming the post the blank is rounded to provide a bulged central portion which, for the sake of convenience I will term a nose and which is indicated by the numeral 7. The portions of the body provided with the opposed openings 5 are brought into contacting engagement, and the securing means, such as bolts or rivets 8 are passed through such alining openings. This is the only point at which the parts of the post contact, as the side members are bent away from each other to provide angle portions 10—10.

The V-shaped prongs 4, at the lower end of the post are preferably rounded slightly inwardly, as clearly disclosed by the drawings. This causes the ground to pack itself between the angle side members 10 of the post when the said post is forced into the ground, and as a consequence the accidental removal of the post will be effectively prevented. In this connection it should be stated that it is not necessary to dig a hole for the insertion of the post as a suitable block or a cap device especially adapted for this purpose, can be arranged over the top end of the post to prevent the marring thereof when the same is subjected to the impact of force such as blows from a sledge employed for forcing the post into the earth.

When the posts are readily positioned, as illustrated in Fig. 1 of the drawings, the line wires 11 are arranged one in each of the openings 1, and as above stated contact with the rounded side walls provided by the openings. When so positioned I insert in the nose portion 7 of the post the elongated body portion 12 of a key 13. The key has one of its ends pointed as at 14 and its opposite end bent to provide a hook 15. The pointed end will readily enter the nose of the body of the key, will contact with the line wires 11 and force the same against the round wall 6 provided by the openings 1. When the key is fully inserted its hooked end 15 will be received in the notch 2 at the upper end of the nose portion of the post which not only limits the downward movement of the key through the post but centralizes the same with respect to its engagement with the line wires. In addition to this the pocketing of the hooked end in the notch will prevent the accidental removal of the key from the post.

Having thus described the invention, what I claim is:—

A fence post formed from a substantially rectangular sheet of metal which is centrally bulged to provide a cross sectionally round nose portion, the metal at the inner ends of the nose portion being brought into contacting engagement and riveted and from thence extended at opposite outer angles to provide the sides of the post, said sides having their lower ends extended beyond the nose and the said extensions being V-shaped in side elevation to provide prongs which are designed to be forced into the ground and to direct the lower portion of the nose also into the gound.

In testimony whereof I affix my signature.

EDWIN T. PETERSON.